United States Patent [19]

Kauer et al.

[11] Patent Number: 5,020,236
[45] Date of Patent: Jun. 4, 1991

[54] METHOD OF MEASURING THE DISTANCE BETWEEN THE AXLES OR WHEELS OF A VEHICLE, AND DEVICE FOR DOING SO

[75] Inventors: Harald Kauer; Knud Overlach, both of Ettlingen; Rolf Edelmann, Durmersheim, all of Fed. Rep. of Germany; Siegfried Gassner, Waynesboro, Pa.

[73] Assignee: Pietzsch AG, Ettlingen, Fed. Rep. of Germany

[21] Appl. No.: 479,067

[22] Filed: Feb. 12, 1990

[51] Int. Cl.[5] ............................................. G01B 7/02
[52] U.S. Cl. ........................................ 33/700; 33/701; 33/706
[58] Field of Search ............... 33/700, 701, 706, 707, 33/712, 501.02, 600, 608, 193; 340/933, 942; 73/146, 865.8

[56] References Cited

U.S. PATENT DOCUMENTS

| 2,954,462 | 9/1960 | Utt et al. | 340/933 |
| 4,015,338 | 4/1977 | Kunze et al. | 33/193 |
| 4,247,768 | 1/1981 | Elmer et al. | 340/942 |
| 4,383,239 | 5/1983 | Robert | 340/933 |
| 4,403,859 | 9/1983 | Ernst | 33/707 |
| 4,663,855 | 5/1987 | Hamilton et al. | 33/600 |
| 4,667,757 | 5/1987 | Johnson | 33/700 |
| 4,840,488 | 6/1989 | Kabaya et al. | 33/707 |

FOREIGN PATENT DOCUMENTS

| 2487555 | 1/1982 | France | 340/933 |
| 0196408 | 11/1983 | Japan | 33/700 |
| 0073415 | 4/1985 | Japan | 33/700 |
| 0285813 | 11/1989 | Japan | 33/706 |
| 1015413 | 4/1983 | U.S.S.R. | 340/933 |
| 1026011 | 6/1983 | U.S.S.R. | 33/701 |

Primary Examiner—Thomas B. Will
Assistant Examiner—C. W. Fulton
Attorney, Agent, or Firm—Max Fogiel

[57] ABSTRACT

An arrangement for measuring the distance between the axles or wheels of a vehicle. A roadway with at least one sensing sill. A sensing section along the roadway with one end a maximum length from the sill corresponding to the smallest spacing between axles to be measured and another end a minimum length from the sill corresponding to the largest spacing between axles to be measured. A first wheel on a first axle of the vehicle being located at the sensing sill and a second wheel on a second axle on the vehicle being located on the sensing section when measuring the distance between the two axles by using the distance measured between the second wheel and the sensing sill.

14 Claims, 2 Drawing Sheets

METHOD OF MEASURING THE DISTANCE BETWEEN THE AXLES OR WHEELS OF A VEHICLE, AND DEVICE FOR DOING SO

BACKGROUND OF THE INVENTION

Methods of measuring the distance between the axles of a vehicle, the interaxle distance, are known. The procedures are important in relation to what is called the bridge law, which provides that a truck can travel over certain bridges only if its axles are separated by at least a certain distance dictated by the particular axle load or if its axle load does not exceed a certain weight dictated by the distance between its axles.

A method that is known although impossible to document from published literature, is employed to determine the interaxle distance of a moving vehicle while its speed is being measured. The interval between when the wheels on one axle travel over a sensor and when the wheels on another axle that is adjacent to the first axle in the direction of travel over the same sensor or the time one axle takes to travel over two sensors distributed at a specific distance apart is determined and mathematically converted into the interaxle distance.

The known procedure accordingly does not comprise measuring a length or distance in the actual sense but constitutes an indirect method wherein the interaxle distance is derived from a measurement of the vehicle's speed and the time it takes to travel a prescribed distance. This method, however, is imprecise, especially at low speeds that may even vary while the vehicle is traveling between the sensors and is accordingly inadequate in terms of the bridge law.

In another known method, described in U.S. Pat. No. 4 667 757, the interaxle distance is determined on a weighing bridge, the front and rear ends of which in terms of the direction of travel rest on supports that accommodate weight-determination scales. When the front axle of a vehicle rolls over the weighing bridge, the weights determined by the scales, which together constitute the front-axle load, are measured just before the rear wheels arrive on the bridge, subsequent to which the interaxle distance is derived from an equation for the moments that represent equilibrium on the bridge.

This approach to determining the interaxle distance, however, is also indirect and accordingly not precise enough for use with the bridge law because the weight can shift considerably due to changes in speed for instance while the vehicle is traveling over the weighing bridge. This drawback is even more serious when several axles, double or triple axles for instance, are on the weighing bridge at the same time.

SUMMARY OF THE INVENTION

One object of the present invention is accordingly to provide a method of measuring the distance between the axles of a vehicle that will be more precise than the known methods and that will lack as extensively as possible the drawbacks that affect the state-of-the-art methods. Another object is a device for carrying out the method.

The former object is attained in accordance with the invention in that, when at least one wheel on the axle of a vehicle is on a sensing sill, the position of at least one wheel on another axle is determined on a section of roadway provided with means of measuring the distance of the wheel from the sill, and the distance between the axles is accordingly determined.

In contrast to the aforesaid known methods, the method of measuring the interaxle distance in accordance with the invention is direct in that it simply determines where on a prescribed section of roadway the wheel or wheels on one axle are when the wheel or wheels on the other axle are at a sensing sill. Since the distance of the beginning of the section of roadway from the sill is known, determining the position of the particular wheel on the section and hence how far the wheel is from the beginning of the section will lead directly to the interaxle distance being sought.

The invention accordingly provides a method of directly measuring the distance between adjacent vehicle axles or wheels along the direction of travel that is independent of the wheel load and speed or change in speed of the vehicle during the measuring process and can accordingly be employed for stop-and-go operation.

The second object is attained in accordance with the invention in that at least one sensing sill and one section at a distance along the roadway therefrom are associated with each roadway and in that, when at least one wheel on one axle is on the sill, active means of measuring the distance of at least one wheel on another axle along the section of roadway are present.

This device accordingly allows the measurement of pure length in that the position of a wheel on one axle is determined at the instant one wheel on an adjacent axle is at the sensing sill. The interaxle distance that is to be determined is accordingly derived as the sum of the distance from the sill to the beginning of the sensing section and the distance between the beginning of the section and the measured position of the wheel in the section.

The sensing sill can to advantage be a sensor, induction loop, or even light-sensitive sensor that extends across the roadway and that, when at least one wheel on a vehicle axle rolls over it, indicates the present of that wheel independent of the speed of travel and of the wheel load.

To ensure universal applicability of the device, the sensing section in one advanced embodiment of the device is placed with one end a distance from the sensing sill no farther than the shortest interaxle distance and a second end a distance at least as far as the longest interaxle distance to be measured. It is accordingly possible to measure the interaxle distance on any type of vehicle.

Another advanced embodiment has at least two sensing sills distributed at a prescribed distance along the roadway, and the sensing section extends from the sensing sill adjacent to it no farther than the shortest interaxle distance and from the sensing sill remote from it at least as far as the longest interaxle distance to be measured.

Using two sensing sills distributed along the roadway makes it possible to keep the sensing section relatively short without affecting the universality of application of the device to vehicles the widest possible range of interaxle distances. It turns out to be practical for the sensing section to be longer along the roadway than the distance between adjacent sensing sills and shorter than the distance between the first and last sensing sill along the roadway.

The means of determining the position of at least one wheel of one axle along the sensing section in the direction of travel in another advanced embodiment of the device are pressure-sensitive scales distributed along the roadway in the direction of travel that display the position of the particular wheel when it rolls over them.

The aforesaid scales can be pressure-sensitive light-conducting cables that indicate the site of pressure by processing the reflection of a signal transmitted through them and that extend across the roadway laterally separated by a distance that is narrower than the footprint of conventional tires.

The means of determining the position of at least one wheel of one axle along the sensing section in the direction of travel in another advanced embodiment of the device are sensors distributed across the direction of travel at prescribed distances from one another at distances from the sensing sill that are also prescribed and that, when a wheel on another axle is also at the sensing sill, display the position within the sensing section of a wheel on an adjacent or other axle and accordingly its distance from the axle at the sensing sill.

This embodiment as well indicates in a simple way the interaxle distance that is to be measured in the form of the distance between the sensing sill where there is at least one wheel on one axle and the sensor in the sensing section that then displays the presence of one wheel of the other axle.

The measurement errors that occur in such a device are naturally smaller the shorter the distances between the sensors extending across the roadway in the sensing section. It has turned out to be especially practical for the sensors in the sensing section to be distributed at equal intervals along the direction of travel that are shorter than the average footprint length of conventional tires on vehicle wheels and on the order of magnitude of the requisite precision.

Since in this type of measurement of the distance of the sensors in the sensing section, whereby the interaxle distance of a vehicle is measured when one wheel of one axle is at a sensing sill, two adjacent sensors in the sensing section are generally covered by at least one wheel of another axle, two lengths that differ by the distance between adjacent sensors in the sensing section are determined, and their mean will more precisely represent the interaxle distance being determined.

The means of determining the position of at least one wheel of one axle along the sensing section in the direction of travel in another advanced embodiment of the device are a photooptically scanned scale with fine graduations that extend across the roadway and are close together along the direction of travel.

The graduations in the sensing section can be applied to the surface of the road or even be superimposed in the form of a night-visibility stationary video imaging system with each frame storing the presence of a wheel in the vicinity of the fine graduations in the sensing section and with the center of the wheel in the sensing section and hence its position in the event of the presence of a wheel on another axle at a sensing sill being determined by image processing.

Any of these embodiments of the measuring device can be used to measure the interaxle distance with high precision if, when the front edge of the footprint of the tire on a wheel reaches the sensor in a sensing sill, the distance to a sensor covered by the front edge of the footstep of the tire on the wheel of another axis in the sensing section is determined, when the rear edge of the footprint of the wheel arrives at the sensing sill, the distance between the latter and the rearmost sensor to be covered along the direction of travel in the sensing section is measured, and, when there is a discrepancy between the two accordingly determined lengths, their mean is derived for exploitation as the interaxle distance being sought.

The measurement procedure occurs similarly in conjunction with the version wherein the sensing section has pressuresensitive contact sensors, in the form of light-conducting cables for example, in that, when the front edge of the footprint of the tire on a wheel reaches the sensor in a sensing sill, the distance to the front edge of the footstep of the tire on the wheel of another axis in the sensing section is determined, when the rear edge of the footprint of the wheel arrives at the sensing sill, the distance between the latter and the rear edge of the footstep of the wheel in the sensing section is measured, and, when there is a discrepancy between the two accordingly determined lengths, their mean is derived for exploitation as the interaxle distance being sought.

BRIEF DESCRIPTION OF THE DRAWINGS

Various embodiments of the method and device for measuring the interaxle distance of a vehicle in accordance with the invention will now be described with reference to the schematic drawings, wherein.

DESCRIPTION OF THE PREFERRED EMBODIMENTS

Figure 1:
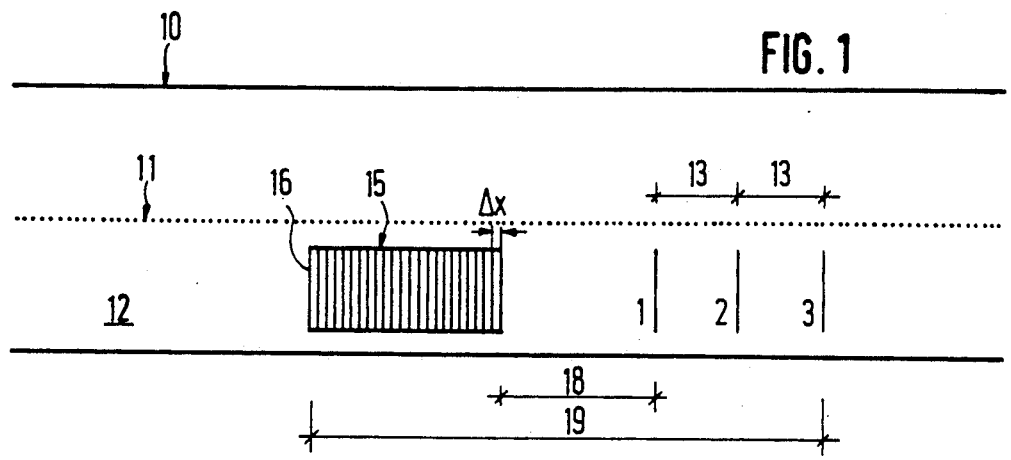
FIG. 1 is a top view of a roadway illustrating three sensing sills distributed along the direction of travel and a sensing section at a prescribed distance along the direction of travel therefrom.
Figure 2:
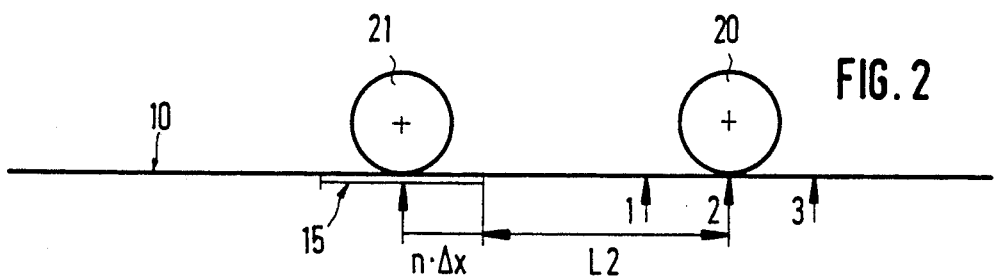
FIG. 2 is a side view of the same situation with one wheel over the sensing sill and another in the sensing section.

Integrated into the lane 12 on one side of the midline 11 of the roadway 10 in the embodiment illustrated in FIGS. 1 and 2 are three sensing sills 1, 2, and 3, separated along the direction of travel by equal intervals 13 of one meter for instance and consisting of contact sensors that can be rolled over. At a distance along the roadway from the sensing sills and on the same side of the road is a sensing section 15 consisting of contact sensors 16 that extend across the roadway and are separated by fine intervals $\Delta X$ of 5 cm for example. The contact sensors in the sensing section and sensing sills are long enough to ensure that, when a vehicle travels a roadway 10 equipped with the device, they will be driven over by one wheel on each axle. The distance 18 between the contact sensor 16 at the end facing the sensing sills in lane 12 and the adjacent sensing sill 1 is no longer than the shortest interaxle distance to be measured, and the distance 19 between sensing sill 3 farthest away from the sensing section and the contact sensor 16 at the other end of lane 12 is at least as long as the longest interaxle distance to be measured.

The widely separated sensing sills 1, 2, and 3 constitute a coarse scale of rollover contact sensors and the closetogether contact sensors 16 in sensing section 15 represent a fine scale. The distance of each individual contact sensor in the sensing section from the contact sensors in the sensing sills is known. When a vehicle travels over a roadway 10 with a device in accordance with the invention, the contact sensors in sensing sills 1, 2, and 3 and in sensing section 15 are rolled over in sequence by the wheels on every axle on one side of the vehicle and the position of the wheels at whatever contact sensor is being rolled over is displayed.

FIG. 2 illustrates a vehicle wheel 20 on an axle above a sensing sill 2 and another wheel 21 on another axle at a distance therefrom in sensing section 15. The contact sensors covered in the sensing sill and sensing section by the two wheels indicate the presence of one wheel each and hence the distance between their associated axles, which equals the known distance between the sensors. If the distance between sensing section 15 and the sensing sill 2 covered by wheel 20 is designated distance L2, if the interaxle distance to be determined is A, if the wheel 21 on the other axle is over the nth contact sensor 16 in sensing section 15, and if the sensors in sensing section 15 are separated by the same distance AX, $$A = L2 + n\gamma X$$

Figure 3:
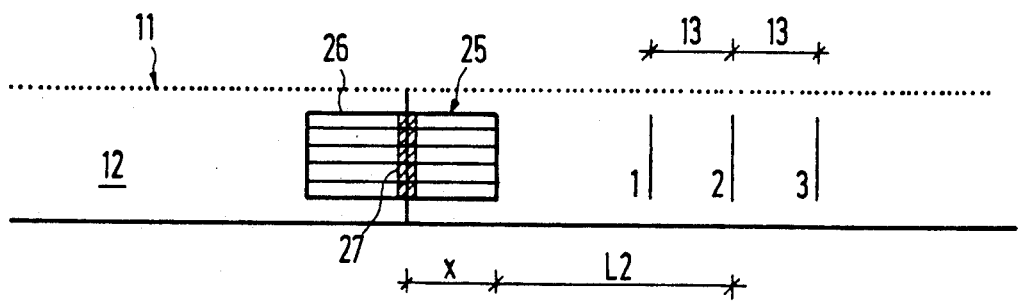
FIG. 3 is a view similar to that in FIG. 1 of a different embodiment.

The sensing sills 1, 2, and 3 in the embodiment illustrated in FIG. 3 again consist of three contact sensors that extend across the roadway 10 in lane 12 at equal intervals 13 along the direction of travel. The contact sensors in sensing section 25 on the other hand are light-conducting cables 26 that parallel the direction of travel and are closer together than the width of the footstep of a conventional vehicle tire. The reflection of signals emitted by these cables can be processed to determine in a simple way the existence of the pressure point 27 in FIG. 3 generated by the weight of a wheel and hence the position of a vehicle in the vicinity of the sensing section. When the position is determined and hence the distance of the pressure point from the end of the sensing section next to the sensing sill is established and when there is a wheel of another axle on a sensing-sill sensor, the interaxle distance can again be directly obtained as the sum of the distance of the wheel from the end of the sensing section next to the sensing sills and of the distance between the latter and the sensing sill in question. If the distance between the end of the sensing section and a sensing sill 2 for example being subjected to pressure by a wheel is again designated L2, the interaxle distance being measured is designated A, and the distance of the site of pressure from the aforesaid end of the sensing section is X, $$A = L2 + X.$$

Although the method of measurement that can be carried out with the device just described is precise, it is subject to error in that the footstep of vehicle tires varies with load. The—load-dependent—length of a footstep contributes to the error in length measurement to the extent that, when a wheel rolls over a sensing sill, it indicates its presence while, when the front edge of a footprint of a wheel on another axle arrives at a contact sensor in the sensing section, it displays the position of the wheel. The error in the measured interaxle distance can accordingly be no greater than the length of the footstep.

Figure 4:
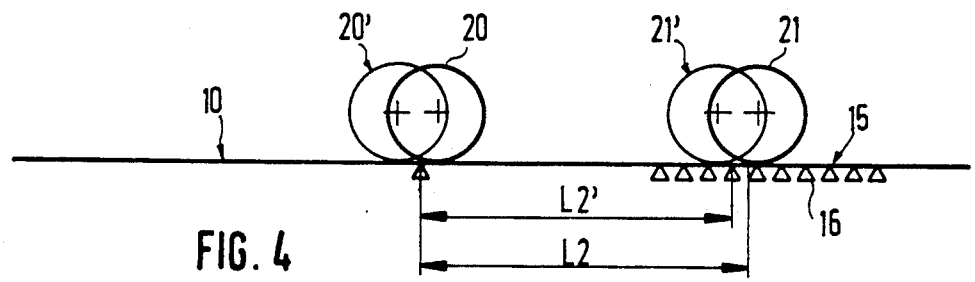
FIG. 4 is a view similar to that in FIG. 2 showing how fine measurements can be obtained by constructing the difference between two results.

When, as illustrated in FIG. 4, two axles on one vehicle are distributed along a roadway and roll over the contact sensors extending across the roadway in the sensing section and sensing sill and when the forward edge of the footstep of wheel 20 arrives at the sensor in the sensing sill, the distance L2 between the sensing sill and a sensor 16 in sensing section 15 that is being covered by the forward edge of the footstep of a wheel on another axle is measured and, subsequent to the lapse of a time $\Delta T$, the distance L2' between the sensing sill and the contact sensor 16 in the sensing section being rolled over by the rear edge of the footstep of wheel 21 is measured as wheel 20 leaves the sensing sill. The positions of the wheels during the second measurements are labeled 20' and 21' in the drawing. If the two results differ, $$A = \tfrac{1}{2}(L2 + L2')$$

by error minimization and a simple determination of the desired interaxle distance.

Figure 5:
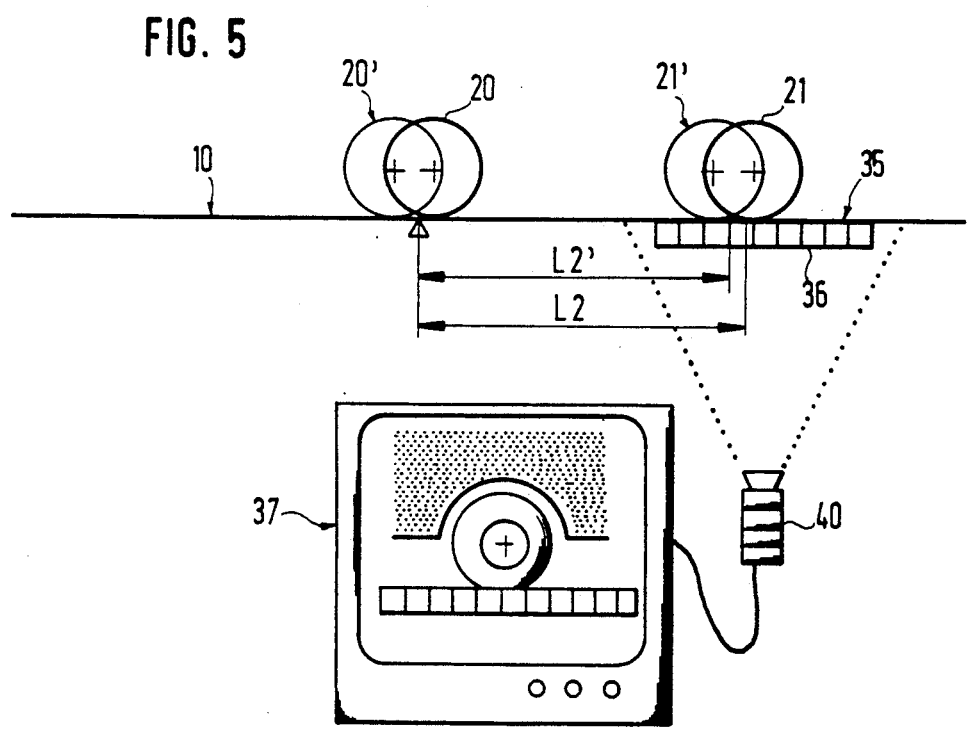
FIG. 5 is another view similar to that in FIG. 2 of a device that operates with optical means.

FIG. 5, finally, illustrates a device wherein a sensing section 35 is equipped with a photooptically scanned scale 36 that can either be applied to roadway 10 or superimposed on a stationary image-pickup system 40. The system can be a night-visibility video system that stores frame by frame in a memory the presence of a wheel 21 in relation to fine graduations at the instant it is detected, whereby image processing yields the center of the wheel and hence the position of the axle associated with it in sensing section 35. The scale is preferably superimposed over pickup optics and always sharply focused on the position of the wheel. This component is represented by the monitor 37 illustrated in FIG. 5 in conjunction with the image-pickup system. The system illustrated in FIG. 5 also includes at least one sensing sill 2 at a prescribed distance from the photooptically sensed scale 36 in sensing section 35 in the form of a contact sensor that extends across the roadway.

Also in conjunction with the system illustrated in FIG. 5, when the tire on a wheel 20 that is associated with one axle rolls over the contact sensor in sensing sill 2, the position of the front edge of the footprint of a wheel 21 on another axle is measured in the vicinity of the fine graduations in the sensing section and subsequently, as wheel 20 leaves the sensing sill (at 20'), the position of the rear edge of the footprint of the other wheel (at 21') is measured in the vicinity of the fine graduations. Two results L2 and L2' are constructed again and the desired interaxle distance obtained as their mean.

We claim:

1. An arrangement for measuring the distance between axles or wheels of a vehicle comprising: a roadway with at least one sensing sill; a sensing section along said roadway having one end a maximum length from said sill corresponding to the smallest spacing between axles to be measured and having another end a minimum length from said sill corresponding to the largest spacing between axles to be measured, at least a first wheel on a first axle of the vehicle being located at said sensing sill and at least a second wheel on a second axle of the vehicle being located on said sensing section when measuring the distance between said first and second axles; and means on said sensing section for measuring the distance of said second wheel from said sensing sill and thereby measuring the distance between said first axle and said second axle.

2. An arrangement as defined in claim 1, wherein said sensing sill comprises an induction loop extending across said roadway and indicating the presence of at least one wheel independent of speed and load on the wheel, when said wheel rolls over said induction loop.

3. An arrangement as defined in claim 1, wherein at least two sensing sills are distributed with predetermined spacing along said roadway and located at different distances from said sensing section, one sensing sill being closest to said sensing section and one sensing sill being located farthest from said sensing section, said sensing section having said one end a length from said closest sill no farther than the shortest distance between axles of the vehicle, and said sensing section having said other end a length from said farthest sensing sill at least as far as the longest distance to be measured between axles.

4. An arrangement as defined in claim 1, wherein said measuring means on said sensing section having pressure-sensitive scales spaced along said roadway for sensing the presence of at least one wheel on said sensing section, said pressure-sensitive scales displaying the position of said at least one wheel when said wheel rolls over said scales.

5. An arrangement as defined in claim 4, wherein said pressure-sensitive scales comprise pressure-sensitive light-conducting cables indicating the location of pressure by processing a reflection of a signal transmitted through said cables.

6. An arrangement as defined in claim 1, wherein said measuring means on said sensing section comprises a plurality of sensors spaced across said roadway at predetermined distances from one another, when at least said first wheel is located at said sensing sill and at least said second wheel is located on said sensing section the location of said second wheel is displayed by said measuring means and thereby the distance of said second axle from said first axle when said first axle is located at said sensing sill.

7. An arrangement as defined in claim 6, wherein said sensors in said sensing section are spaced at equal intervals along said roadway, said intervals being shorter than the average footprint length of tires on vehicles, said intervals being dependent also on the order of magnitude of requisite tolerances of said footprint length.

8. An arrangement as defined in claim 1, wherein said measuring means on said sensing section comprises a photoopticly scanned scale having fine graduations extending across said roadway and being closely spaced along directions of travel along said roadway.

9. An arrangement as defined in claim 8, wherein said graduations on said sensing section are applied to the surface of said roadway.

10. An arrangement as defined in claim 8, including a night-visibility stationary video imaging system, said graduations being superimposed on said video imaging system, said imaging system having frames with each frame storing presence of a second wheel in vicinity of said graduations, said second wheel being located at a distance from said first wheel that is measured by image processing through said video imaging system.

11. An arrangement as defined in claim 1, wherein said sensing sill comprises a light-sensitive sensor extending across said roadway, said light-sensitive sensor indicating presence of at least one wheel rolling over said light-sensitive sensor independent of speed of travel and load on the wheel.

12. An arrangement for measuring the distance between axles or wheels of a vehicle comprising: a roadway with at least one sensing sill; a sensing section along said roadway having one end a maximum length from said sill corresponding to the smallest spacing between axles to be measured and having an other end a minimum length from said sill corresponding to the largest spacing between axles to be measured, at least a first wheel on a first axle of the vehicle being located at said sensing sill and at least a second wheel on a second axle of the vehicle being located on said sensing section when measuring the distance between said first and second axles; and mans on said sensing section for measuring the distance of said second wheel from said sensing sill and thereby measuring the distance between said first axle and said second axle; at least three sensing sills being distributed with predetermined spacing along said roadway and located at different distances from said sensing section, one sensing sill being closest to said sensing section and one sensing sill being located farthest from said sensing section, said sensing section having said one end a length from said closest sill no farther than the shortest distance between axles of the vehicle, and said sensing section having said other a length from said farthest sensing sill at least as far as the longest distance to be measured between axles; said sensing section being longer along said roadway than the spacing between adjacent sensing sills, and said sensing section being shorter than the distance between said closest sensing sill and said farthest sensing sill along said roadway.

13. A method for measuring the distance between axles or wheels of a vehicle comprising the steps: positioning at least one sensing sill with a first sensor therein on a roadway; having a sensing section a length from said sensing sill; moving a first wheel on a first axle of the vehicle to said sensing sill with said first wheel leaving a first footprint having a front edge at said first sensor, a second wheel on a second axle of the vehicle leaving a second footprint with a front edge in said sensing section; sensing the front edge of said second sensor; measuring a first distance between said first sensor and said second sensor; movign said first wheel further for leaving a rearmost edge of said first footprint at said first sensor at said sill; sensing said rearmost edge of said first footprint by said first sensor; sensing the rearmost edge of said second footprint by said second sensor in said second section; measuring a second distance between said first sensor and said second sensor when sensing the rearmost edges of said first footprint and said second footprint; comparing said first distance and said second distance; and calculating a means distance of said first distance and said second distance when said first distance differs from said second distance for determining the distance between said first axle and said second axle.

14. A method for measuring the distance between axles or wheels of a vehicle comprising the steps: positioning at least one sensing sill with a sensor therein on a roadway; having a sensing section a length from said sensing sill; moving a first wheel on a first axle of the vehicle to said sensing sill with said first wheel leaving a first footprint having a front edge at said sensor, a second wheel on a second axle of the vehicle leaving a second footprint with a front edge in said sensing section; measuring a first distance between the front edge of said first footprint and the front edge of said second footprint; moving said first wheel further for leaving a rearmost edge of said first footprint at said sensor at said sill; measuring a second distance between the rearmost edge of said first footprint and the rearmost edge of said second footprint; comparing said first distance and said second distance; and calculating a mean distance of said first distance and said second distance when said first distance differs from said second distance for determining the distance between said first axle and said second axle.

* * * * *